United States Patent

Braun

[11] Patent Number: 6,146,126
[45] Date of Patent: Nov. 14, 2000

[54] HOT RUNNER SYSTEM, IN PARTICULAR HOT RUNNER NOZZLE FOR AN INJECTION MOLDING MACHINE OR PLASTICS INJECTION MOLD

[75] Inventor: Peter Braun, Hungen, Germany

[73] Assignee: EWIKON Heisskanalsysteme GmbH & Kommanditgesellschaft, Kirchlengern, Germany

[21] Appl. No.: 09/223,946

[22] Filed: Dec. 31, 1998

[30] Foreign Application Priority Data

Dec. 31, 1997 [DE] Germany ............................ 197 58 322
Dec. 31, 1997 [DE] Germany ............................ 197 58 323

[51] Int. Cl.[7] .................................................... B29C 45/22
[52] U.S. Cl. ...................... 425/549; 264/328.15; 425/577
[58] Field of Search ..................... 425/549, 577; 264/328.15

[56] References Cited

U.S. PATENT DOCUMENTS 4,576,567 3/1986 Gellert ..................................... 425/549
4,902,219 2/1990 Leverenz ................................. 425/549

FOREIGN PATENT DOCUMENTS 0 137 888 4/1985 European Pat. Off. .

*Primary Examiner*—Tim Heitbrink
*Attorney, Agent, or Firm*—Henry M. Feiereisen

[57] ABSTRACT

A hot runner system, in particular a heatable injection nozzle for an injection molding machine or plastics injection mold, includes a central heating rod having opposite ends and defining a longitudinal axis, a sleeve assembly which surrounds the heating rod and is split radially to define first and second sleeves abutting one another, and current-conducting means for feeding an electric current to the sleeve assembly. The heating rod is electrically connected with each end of the sleeve assembly. One of the sleeves is formed at the interface to the other sleeve with a flange which extends substantially parallel to the longitudinal axis and forms at least one flow passageway for melt, whereby the flow passageway is bounded along its entire length by a wall surface made entirely of metal.

29 Claims, 9 Drawing Sheets

HOT RUNNER SYSTEM, IN PARTICULAR HOT RUNNER NOZZLE FOR AN INJECTION MOLDING MACHINE OR PLASTICS INJECTION MOLD

CROSS-REFERENCES TO RELATED APPLICATIONS

This application claims priorities of German Patent Applications, Ser. Nos. 197 58 322.9, filed Dec. 31, 1997, and 197 58 323.7, filed Dec. 31, 1997, the subject matters of which are incorporated herein by reference.

BACKGROUND OF THE INVENTION

The present invention relates, in general, to a hot runner system, and in particular to a hot runner nozzle for an injection molding machine or plastics injection mold.

A hot runner nozzle is, for example, known from European Pat. No. 0 137 888 A2 and includes a central heating rod which is surrounded by a sleeve which is radially split to form two sleeves. Arranged between the heating rod and the split sleeve is an electric insulation, with the heating rod having opposite free ends which are electrically connected to the adjacent ends of the sleeves, while the opposite adjoining ends of the sleeves are formed with a flange for introduction of electric current.

This type of conventional hot runner nozzle has the drawback that the split outer sleeves are formed with flanged enlargements which are separated by an electric insulation while the insulation extends to the flow channel traversing the flanges. Thus, the insulation comes into contact with the melt and hence is exposed to all forces and loads as generated by the construction and operational loads, such as erratically changing extremely high pressures of the flowing melt. This is especially disadvantageous when the melt contains solids such as fiberglass fractions.

Also, the beginning destruction of the insulating layers results in the creation of voids which are being filled by the melt, leading to dead spaces and complicating a paint change or material change, in the event such changes become necessary. Melt migrating into the gaps formed as a result of a destruction of the insulation acts on the thus-exposed surfaces of the flanges to push them apart so that melt can penetrate, ultimately destroying the functionality of the nozzle.

SUMMARY OF THE INVENTION

It is thus an object of the present invention to provide an improved hot runner system or improved hot runner nozzle, obviating the afore-stated drawbacks.

This object, and others which will become apparent hereinafter, are attained in accordance with the present invention by providing a central heating rod having opposite ends, a sleeve assembly enclosing the rod and split radially to define first and second sleeves abutting one another, wherein one of the opposite ends of the rod is electrically connected to a free end of the first sleeve and the other one of the opposite ends of the rod is electrically connected to a free end of the second sleeve, with the second sleeve having another end distant to the free end thereof and formed with a flange, a casing flange surrounding and electric insulating the first sleeve, whereby the casing flange has one end face materially joined with an end face of the flange of the second sleeve, with the casing flange and the flange of the second sleeve defining at least one common flow passageway bounded by a wall surface made entirely of metal, and a current-conducting unit for feeding an electric current to the sleeve assembly.

This object can also be attained in accordance with the present invention by providing the second sleeve of the sleeve assembly with a flange at the interface to the first sleeve, with the flange extending substantially parallel to the longitudinal axis of the heating rod and forming at least one flow passageway for melt, whereby the flow passageway is bounded along its entire length by a wall surface made entirely of metal.

Advantageously, the entire length of the flow passageway is made uninterrupted by a same material.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
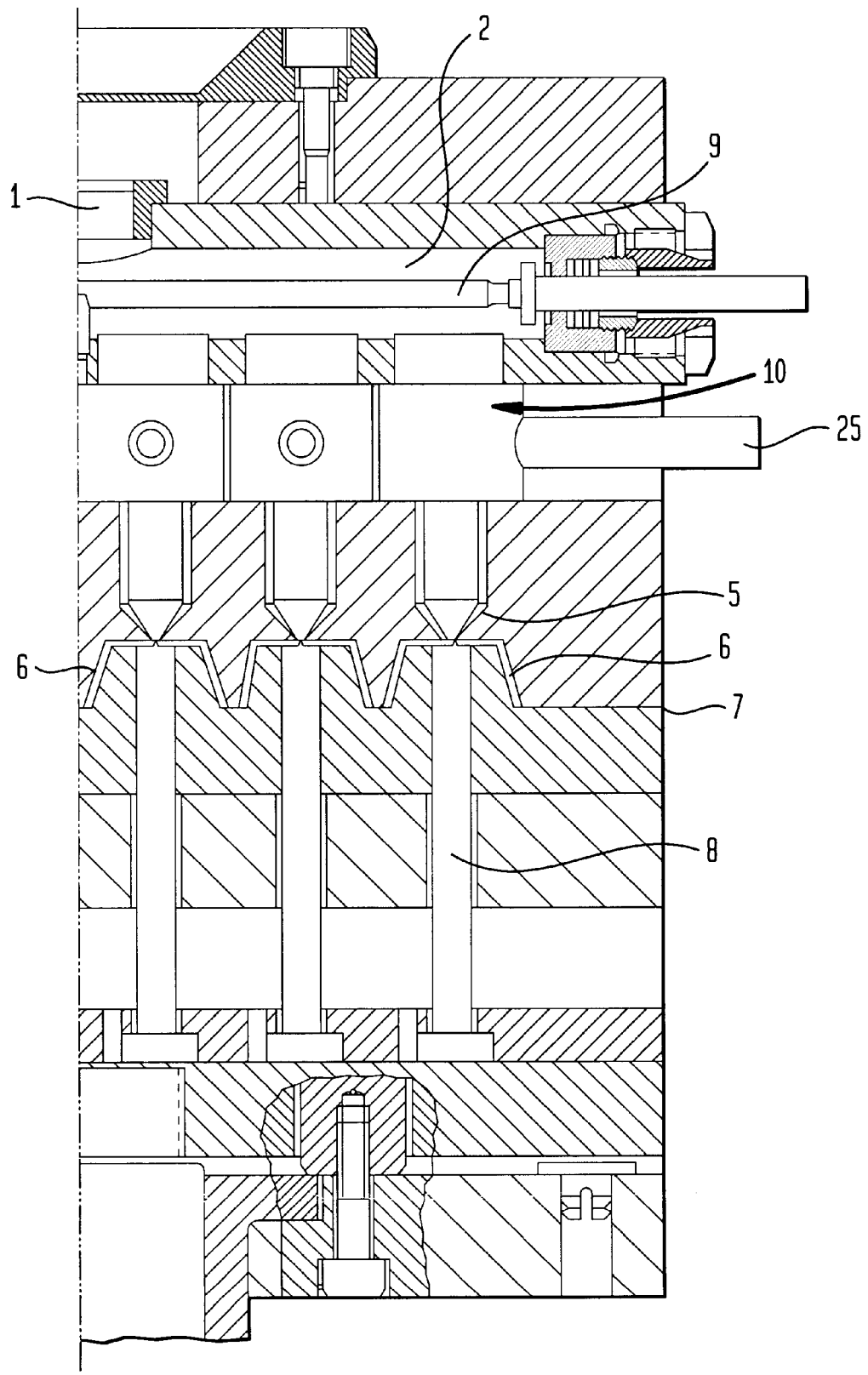
FIG. 1 is a fragmentary, sectional view of a plastics injection mold, embodying a hot runner nozzle according to the present invention.

Throughout all the Figures, same or corresponding elements are generally indicated by same reference numerals.

Turning now to the drawing, and in particular to FIG. 1, there is shown a fragmentary, sectional view of a plastics injection mold which has incorporated therein a plurality of hot runner nozzles, generally designated by reference numeral 10, for manufacturing several articles at a same time. In the nonlimiting example of FIG. 1, the nozzles 10 are positioned in parallel relationship. The injection mold includes a sprue bushing 1 through which molten material is poured into a manifold 2. Arranged in the manifold 2 is a hot wire 9 for maintaining the temperature of the melt. The manifold 2 feeds the melt via the nozzles 10 and outlet orifices 5 into corresponding cavities 6 of the mold for producing the desired products. After conclusion of the molding process, the mold is opened in plane 7, with the molded articles being extracted by ejectors 8.

It will be appreciated by persons skilled in the art that the injection mold contains much mechanical components which are not described in more detail in the following description, as these components do not form part of the present invention, and has been described in detail for the sake of simplicity.

Figure 2:
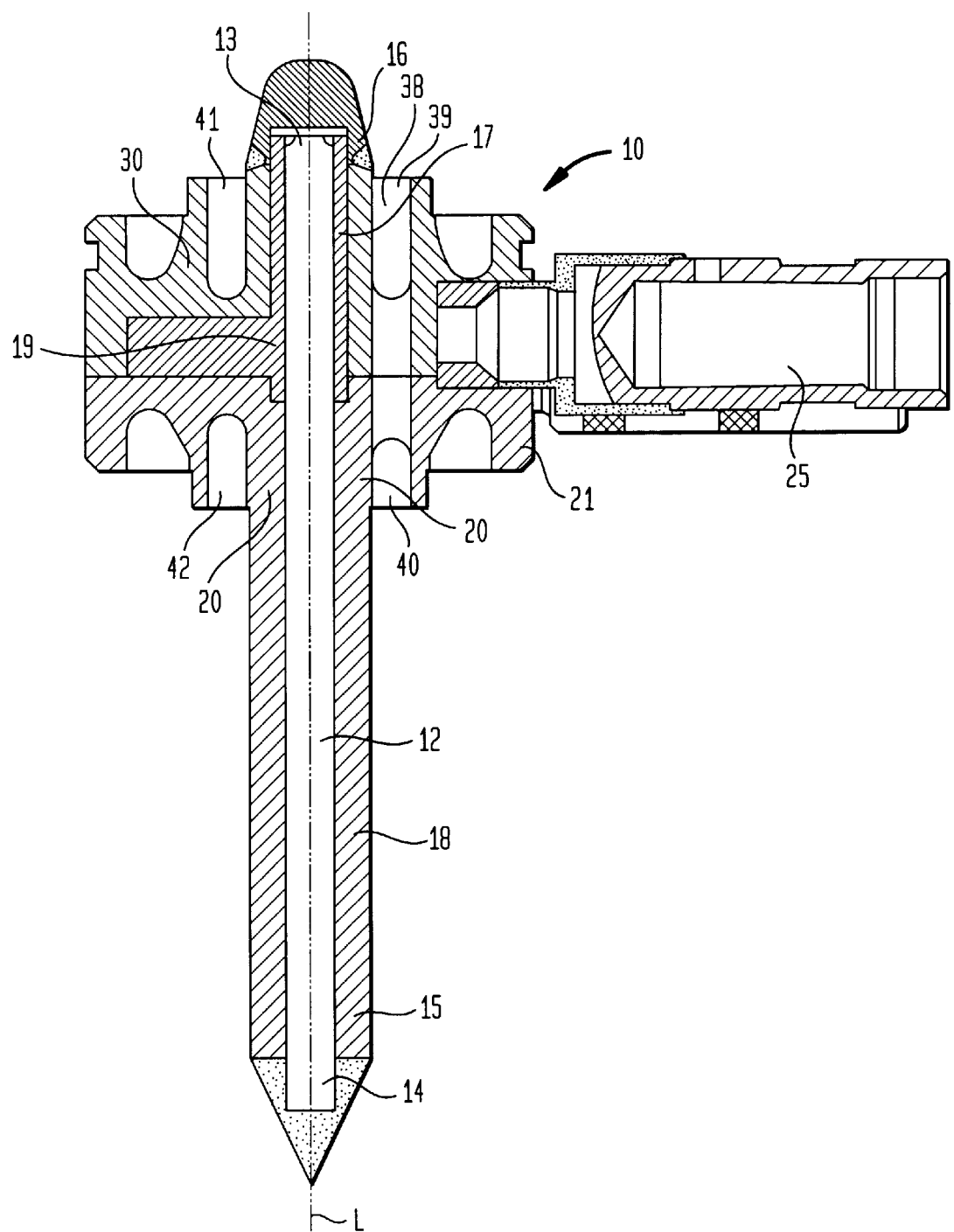
FIG. 2 is a cutaway, sectional view of one embodiment of a hot runner nozzle according to the present invention.

Turning now to FIG. 2, there is shown a cutaway, sectional view of a first embodiment of a hot runner nozzle 10 according to the present invention. The nozzle 10 includes a central elongate heating rod 12 which defines a longitudinal axis L and is surrounded by a sleeve assembly which is radially split to thereby define a first sleeve 17 and a second sleeve 18 which abut one another at their adjoining ends. The rod 12 has opposite free ends 13, 14, with free rod end 13 being electrically connected to the free end 16 of sleeve 17, and with free rod end 14 being electrically connected to the free end 15 of sleeve 18. Along the common length section in direction of the longitudinal axis L, the heating rod 12 is electrically insulated from the sleeves 17, 18.

In the area of their abutting ends 19, 20, structural components of greater diameter are attached, optionally in single-piece or multi-piece design, to the sleeve 18. For example, as shown in FIG. 2, the sleeve 18 has formed thereon a flange 21.

Figure 3:
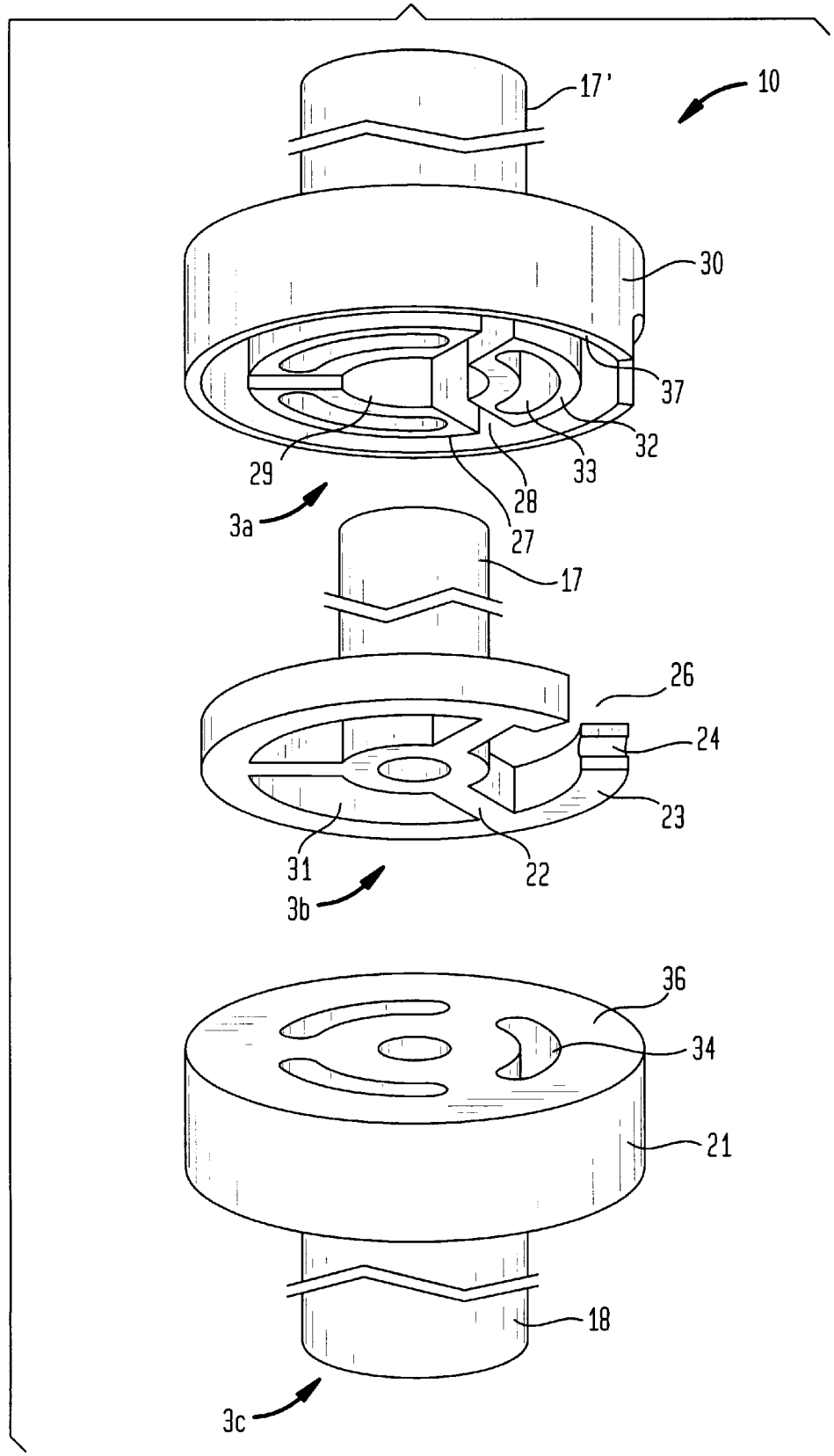
FIG. 3 is an exploded perspective illustration of relevant components of the hot runner nozzle of FIG. 2.

Turning now to FIG. 3, there is shown, for better understanding, an exploded perspective illustration of the relevant components of the hot runner nozzle 10 of FIG. 2. The nozzle 10 is generally comprised of three components, generally designated by reference numerals 3a, 3b and 3c. The nozzle component 3a includes a cylinder 17' which terminates in a casing flange 30 formed interiorly with distinct bores 27, 28, 29. These bores 27, 28, 29 are bounded by metallic walls 32 of the casing flange 30 to thereby form flow channels 33 which traverse the casing flange 30. In its middle, the casing flange 30 has an opening 11 for receiving the sleeve 17 of the nozzle component 3b which further includes a substantially ring-shaped current distributor 23, whereby the sleeve 17 is connected at end 19 to the distributor 23 via three current-carrying bridges 22 which are spaced from one another to thereby define openings 31 in conjunction with the distributor 23. The distributor 23 does not describe a full circle but is provided with a gap 26, whereby the confronting ends of the ring are formed with threads for attachment of a connector, e.g. plug connector 25 (FIG. 2). The nozzle component 3b comprised of sleeve 17, current-carrying bridges 22 and distributor 23, is so configured as to fit within the bores 27, 28, 29 of the casing flange 30 in an electrically insulated manner, with the openings 31 receiving the flow channels 33.

The third nozzle component 3c includes the sleeve 18 which is formed with the flange 21, whereby flow channels 34 traverse the flange 21 in direction of longitudinal axis L.

When assembling the hot runner nozzle 10, the nozzle component 3b is inserted in the casing flange 30 of nozzle component 3a and placed together with the nozzle component 3a on the nozzle component 3c, so that the flow channels 33 are continued by the flow channels 34 to thereby form continuous flow passageways 38, as indicated in FIG. 2. As the flange 21 bears with its end face 36 upon the confronting end faces of the walls 32 and an outer confronting annular surface 37 of the casing flange 30, the surfaces 32, 36 37 are thus in flat engagement and can be materially joined together, especially through soldering, in the assembled state.

Melt thus enters the common flow passageways 38, comprised of flow channels 33 and flow channels 34, in the hot runner nozzle 10 at inlet 39 and exit through outlet 40, whereby the common flow passageways 38 are bounded exclusively by metallic wall surfaces. In order to design the flow passageways 38 of shortest possible length, circumferential grooves 41, 42 are provided in the area of the melt inlet 39 and melt outlet 40 for counteracting a pressure drop.

Figure 4:
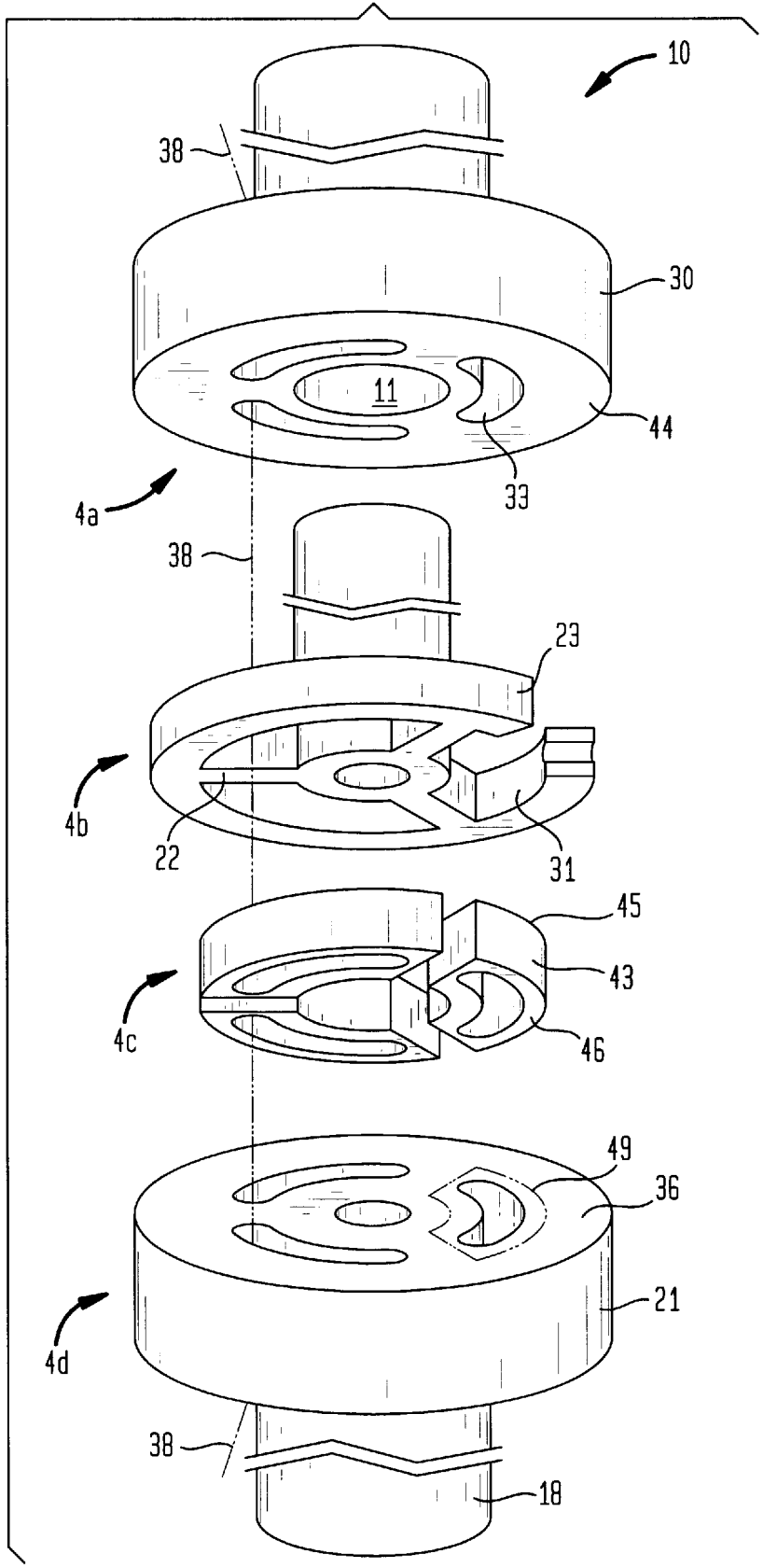
FIG. 4 is an exploded perspective illustration of relevant components of another embodiment of a hot runner nozzle according to the present invention.

Referring now to FIG. 4, there is shown an exploded perspective illustration of the relevant components of a second embodiment of a hot runner nozzle 10 according to the present invention for use in the injection mold of FIG. 1. The nozzle 10 is comprised of four components 4a, 4b, 4c, 4d. The nozzle component 4a includes casing flange 30 which has formed therein flow channels 33. The nozzle component 4b corresponds substantially to the nozzle component 3b of the first embodiment of FIG. 3; however, in contrast to the embodiment of nozzle 10 of FIG. 3, the current-carrying bridges 22 and the distributor 23 are not integrated within the casing flange 30 but merely abut the confronting end face 44 thereof. Insertable within the openings 31 of the nozzle component 4b are separately manufactured metallic segments 43 which together form the nozzle component 4c and define respective flow channels between opposite end faces 457 46. The fourth nozzle component 4d substantially corresponds to the nozzle component 3c of FIG. 3.

In the final assembly state of the nozzle 10 of FIG. 4, continuous flow passageways 38 are formed which are bounded exclusively by metallic wall surfaces, whereby the end face 44 of the casing flange 30 is in metallic contact with the end face 45 of the nozzle component 4c, and the end face 36 of the flange 21 is in metallic contact with the end face 46 of the nozzle component 4c.

Persons skilled in the art will understand that the segments 43 may be so dimensioned as to traverse the flange 30 and/or flange 21 either entirely or partially in direction of the longitudinal axis L. In either case, the flange 21 of the nozzle component 4d and/or the flange 30 of the nozzle component 4a are formed at their segment-confronting end faces with recesses 49 (only one recess 49 is shown here for illustrative purposes) which, as indicated by dashed line in FIG. 4 in conjunction with nozzle component 4d, correspond to the contour of the segments 43 so that the segments 43 are, at least partially, embedded in the flange 21 an/or flange 30.

Figure 5:
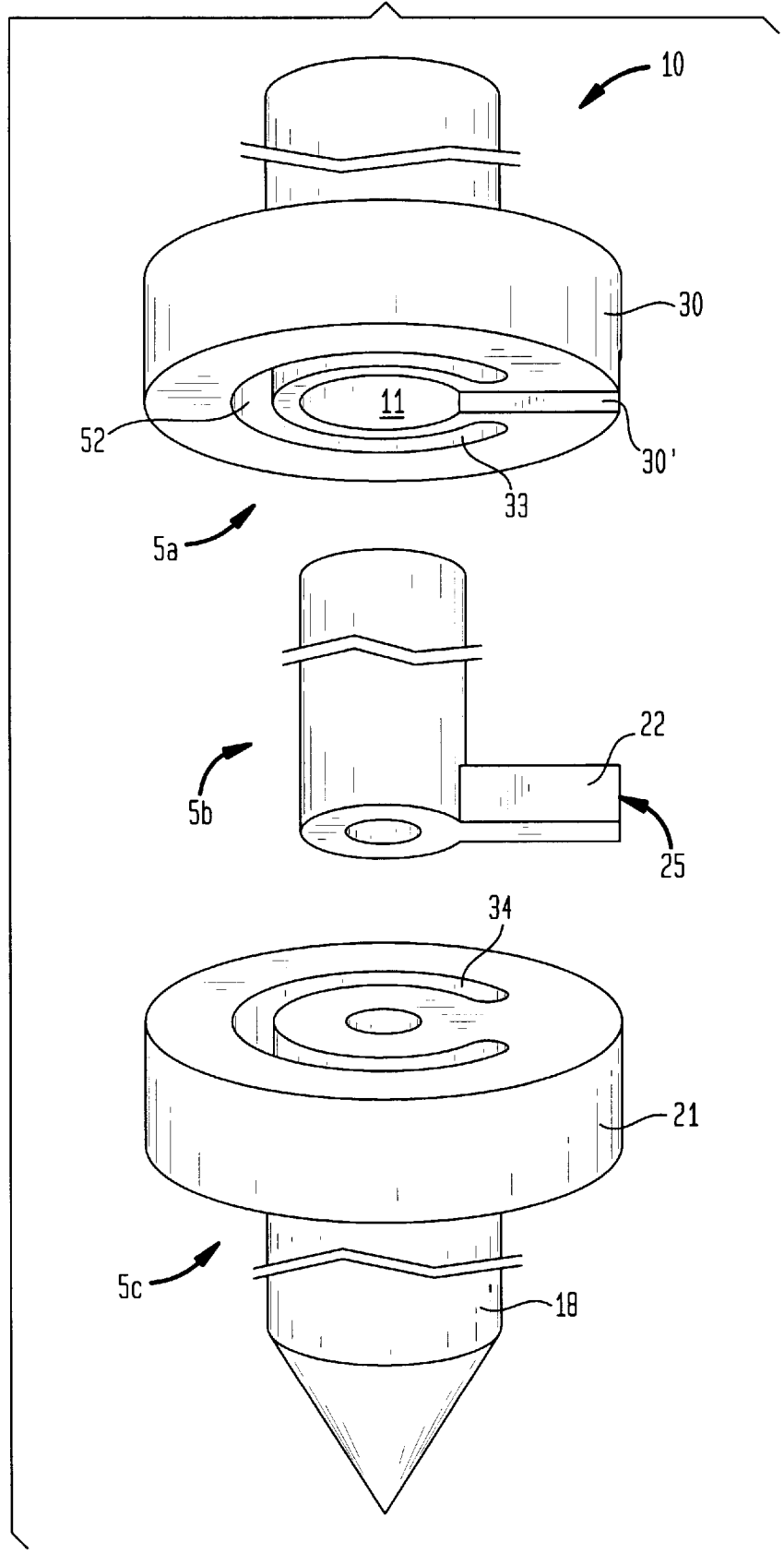
FIG. 5 is an exploded perspective illustration of relevant components of still another embodiment of a hot runner nozzle according to the present invention.

FIG. 5 shows an exploded perspective illustration of the relevant components of a third embodiment of a hot runner nozzle 10 according to the present invention, which is comprised of three components 5a, 5b, 5c. The nozzle component 5a includes casing flange 30 which is formed interiorly with a flow channel 33 that almost entirely circumscribes the center opening 11 for receiving the sleeve 17 of the second nozzle component 5b. In the embodiment of FIG. 5, the nozzle component 5b includes only one current-carrying bridge 22 without attachment of a distributor, for embedment in an electrically insulated manner within a complementary slot 30' of the casing flange 30. Thus, the flow channel 33 can be configured almost entirely in a ring-shaped manner which is only interrupted for passage of the current-carrying bridge 22. Connector 25, as shown in FIGS. 1 and 2 is electrically connected to the current-carrying bridge 22. The nozzle component 5c includes the flange 21 which has formed therein the flow channel 34 in a configuration corresponding to the configuration of the flow channel 33 of casing flange 30.

Suitably, a thin-walled web 52 may be incorporated in one of the flanges 21, 30 for stabilization purposes. As shown by way of example only, such a web 52 is indicated by dashed line in the flow channel 33 of the casing flange 30.

Figure 6:
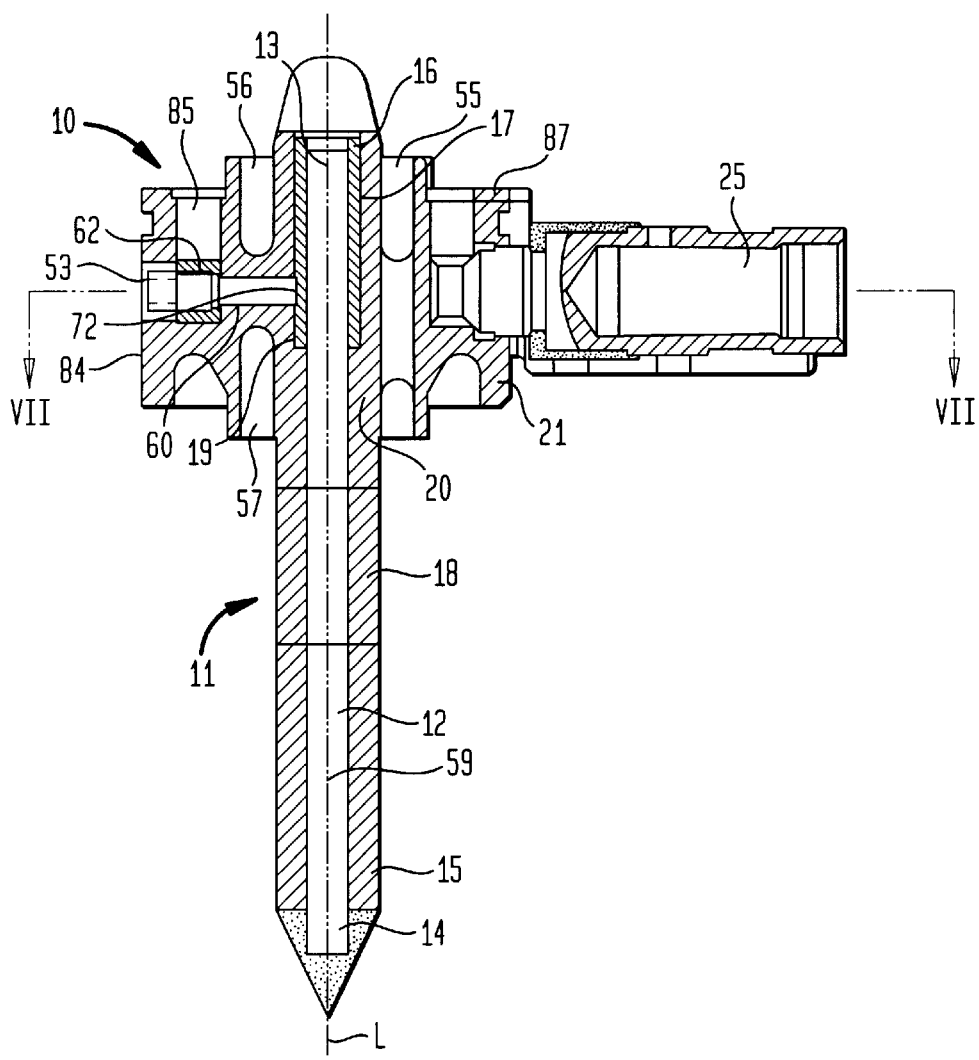
FIG. 6 is an exploded perspective illustration of yet another embodiment of a hot runner nozzle according to the present invention.

Turning now to FIG. 6, there is shown an exploded perspective illustration of another embodiment of a hot runner nozzle 10 according to the present invention for installation in, for example, an injection mold shown in FIG. 1. The hot runner nozzle 10 includes the central elongate heating rod 12 which is electrically connected with its free end to the free end 16 of the sleeve 17, and with its opposite free rod end 14 to the free end 15 of the sleeve 18. Along the common length section in direction of the longitudinal axis L, the heating rod 12 is electrically insulated from the sleeves 17, 18.

In the area of their abutting ends 19, 20, structural components of greater diameter are attached, optionally in single-piece or multi-piece design, to either one of the sleeves 17, 18. In the non-limiting example of FIG. 4, the sleeve 18 has formed thereon e.g. flange 21.

Figure 7:
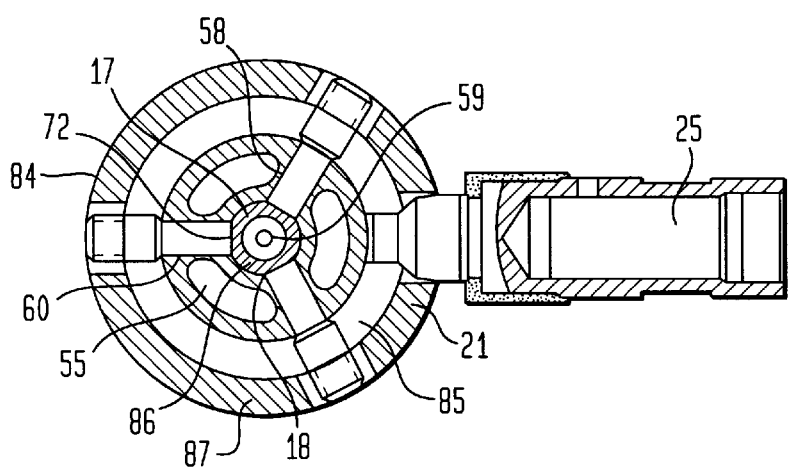
FIG. 7 is a sectional view of the hot runner nozzle of FIG. 6, taken along the line VII—VII in FIG. 7.

The flange 21 is formed adjacent the sleeve 18 with a flow passageway 55 which traverses the flange 21 in direction of the longitudinal axis L. As shown in FIG. 7, the flow passageway 55 is subdivided by webs 58 which connect the flange 21 with the sleeve 18. Each web 58 is formed with a channel 60 which extends radially across from the outer surface area 84 of the flange 21 to the center bore 86 of the sleeve 18. These channels 60 cross thereby, entirely or partially, a circumferential annular groove 85 which is formed in the end face of the flange 21 for engagement of a current distributor 62, shown by way of examples in FIGS. 8 to 11, when assembling the nozzle 10. The current distributor 62 is embedded in the groove 85 electrically insulated against the flange 21, while current-carrying bridges 53 are arranged, electrically insulated, within the channels 60 for realizing an electric conduction between the current distributor 62 and the sleeve 17, to thereby form an electric circuit as follows:

The electric connector 25, preferably a plugged contact or screwed contact, for attachment of power supply cables (not shown), is electrically connected to the current distributor 62 via which current flows to the sleeve 17 via the current-carrying bridges 53 extending in-between. As the free end 16 of the sleeve 17 is electrically connected with the free end 13 of the heating rod 12, while the other end 14 of the heating rod 12 is electrically connected to the end 15 of the sleeve 18 which in turn is connected to the flange 21, the electric circuit is grounded.

In order to keep the flow resistance in the flow passageways 55 as low as possible, annular grooves 56, 57 may be provided in the flange 21 for limiting the length of the webs 58.

Figure 8:
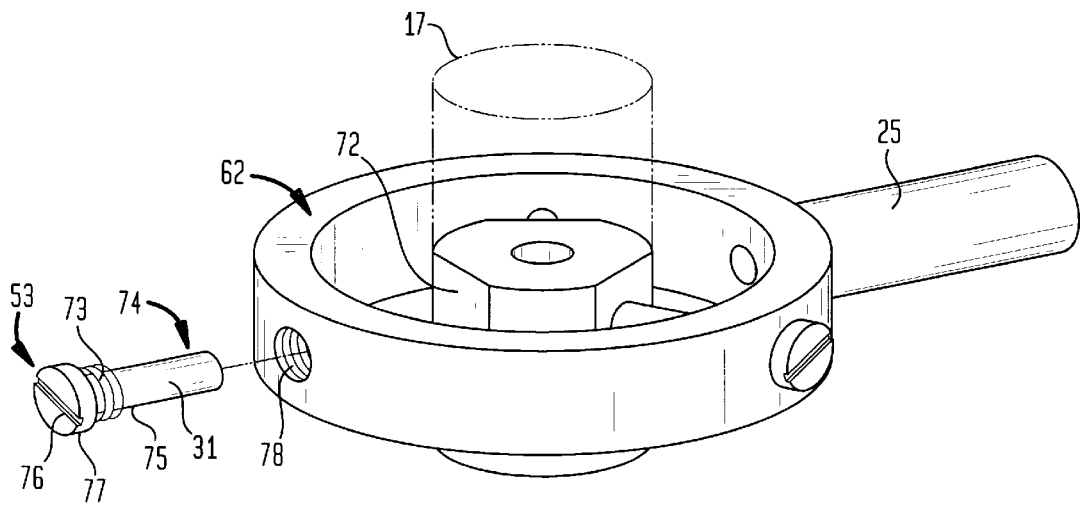
FIG. 8 is a schematic, top and side perspective view of a current distributor in conjunction with its attachment to a sleeve via current-carrying bridges, for use with a hot runner nozzle according to the present invention.

Turning now to FIG. 8, there is shown a schematic, top and side perspective view of a first variation of a current distributor 62 in conjunction with its attachment to the sleeve 17 via the current-carrying bridges 22, for use with a hot runner nozzle 10 according to FIG. 6. The distributor 62 is configured as a ring which is formed with spaced-apart threaded bores 78 and surrounds the sleeve 17 at a distance thereto. The sleeve 17 is of hexagonal configuration with flat surfaces 72 for realizing a contact with the current-carrying bridges 53 over a wide area. Each of the current-carrying bridges 53 is formed as bolt having a cylindrical shaft 75 which has one end for effecting a contact with the sleeve 17 and terminates in at the sleeve-distal end in a threaded section 73. Suitably, the threaded section 73 of the bolt 53 ends in a head 77 which is formed with a slot 76 or the like for engagement of a turning tool. The bolts 53 are insertable through the threaded bores 78 of the current distributor 62, whereby the threaded section 73 of the bolts 53 are meshed in the threaded bores 78 at same torques, thereby realizing on all current-carrying bridges 53 same contact pressures which is further enhanced by the elastic deformability of the current distributor 62.

Figure 9:
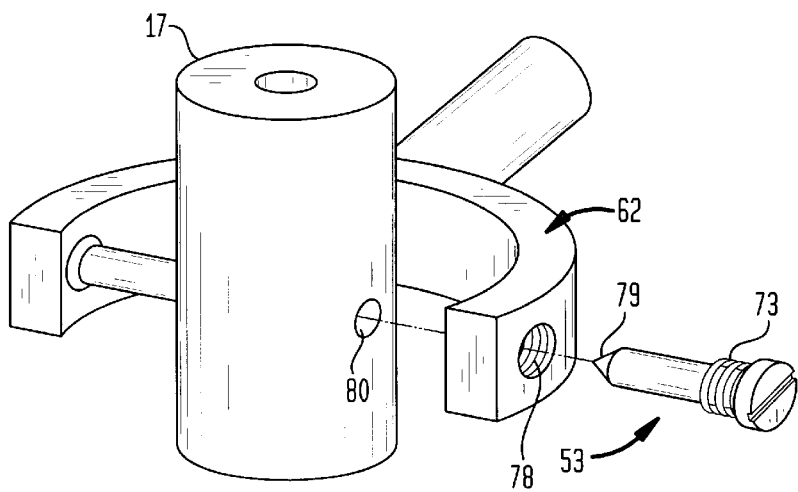
FIG. 9 is a schematic, top and side perspective view of a variation of a current distributor in conjunction with its attachment to a sleeve via currentcarrying bridges, for use with a hot runner nozzle according to the present invention.

FIG. 9 shows another variation of a current distributor 62 which encloses the sleeve 17 in the form of a substantially semicircular configuration, which is formed near the ends thereof with threaded bores 78. The sleeve 17 is formed with two tapered bores 80 on opposite sides for engagement of two current-carrying bridges 53 in the form of bolts which are inserted through the bores 78 of the distributor 62 and enter with their tapered pointed end 79 in the bores 80, whereby the threaded section 73 of each bolt 53 meshes with the associated threaded bore 78. Also in this variation, the current-carrying bridges 53 are elastically deformable to realize a respective contact pressure when engaging the bolts 53. At the same time, by engaging the pointed end 79 in the bore 80, the sleeve 17 and the current-carrying bridges 53 are in fixed relationship to one another.

Figure 10:
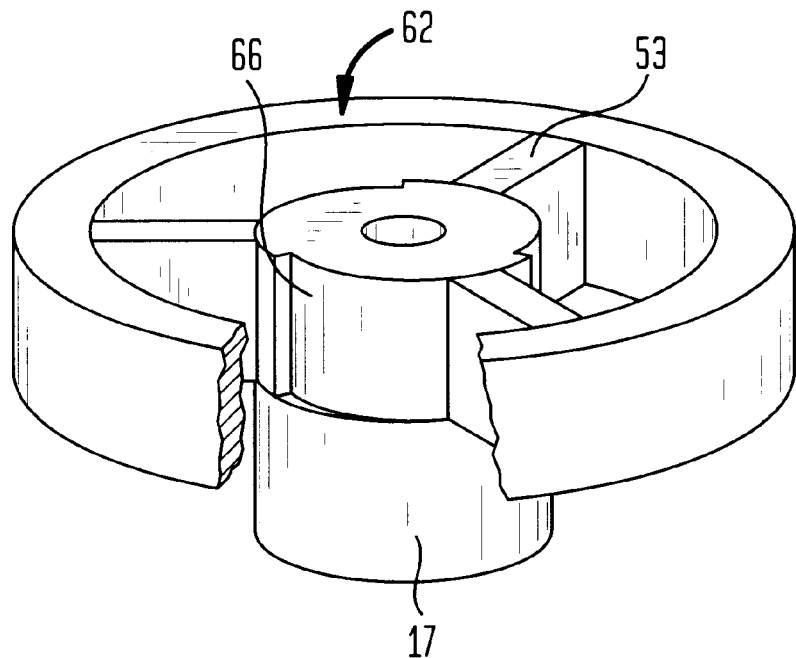
FIG. 10 is a schematic, top and side perspective view of still another variation of a current distributor in conjunction with its attachment to a sleeve via current-carrying bridges, for use with a hot runner nozzle according to the present invention.

FIG. 10 shows still another example of a current distributor 62 which is connected by three spaced-apart current-carrying bridges 53 of any suitable cross section to the sleeve 17. In the contact area with the current-carrying bridges 53, the sleeve 17 has an eccentrically shaped or ratchet-like outer surface area 66. Before assembling the hot runner nozzle 10 and connecting the free end 13 of the heating rod 12 with the free end of the sleeve 17, the sleeve 17 is so turned that the eccentric surfaces 66 clamp the current-carrying bridges 53 between the sleeve 17 and the current distributor 62.

Figure 11:
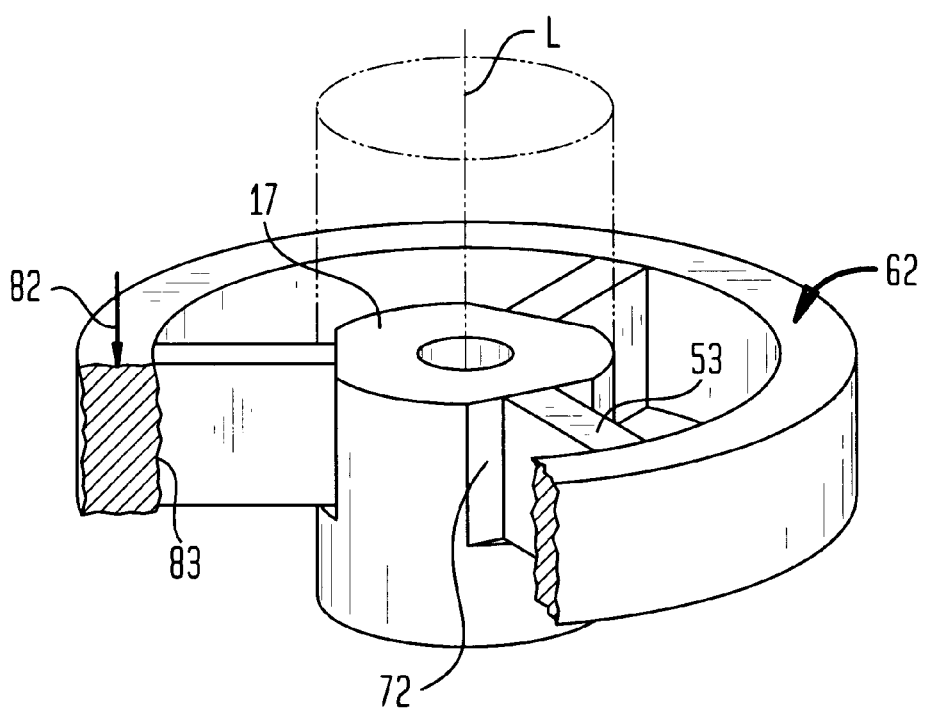
FIG. 11 is a schematic, top and side perspective view of yet another variation of a current distributor in conjunction with its attachment to a sleeve via current-carrying bridges, for use with a hot runner nozzle according to the present invention.

FIG. 11 shows yet another variation of the current distributor 62 in which the current-carrying bridges 53 are wedged between the sleeve 17 and the distributor 62 by forming the distributor 62 with an inner surface area 83 which is inclined at an acute angle to the longitudinal axis L and by axially displacing the distributor 62 in direction of arrow 82. Also in this embodiment, the required contact pressure on the current-carrying bridges 53 is realized by the elastic deformability of the current distributor 62. Persons skilled in the art will understand that the wedge action can also be realized when cylindrically forming the inner surface area of the distributor 62 for cooperation with inclined outer surfaces of the sleeve 17.

Figure 12:
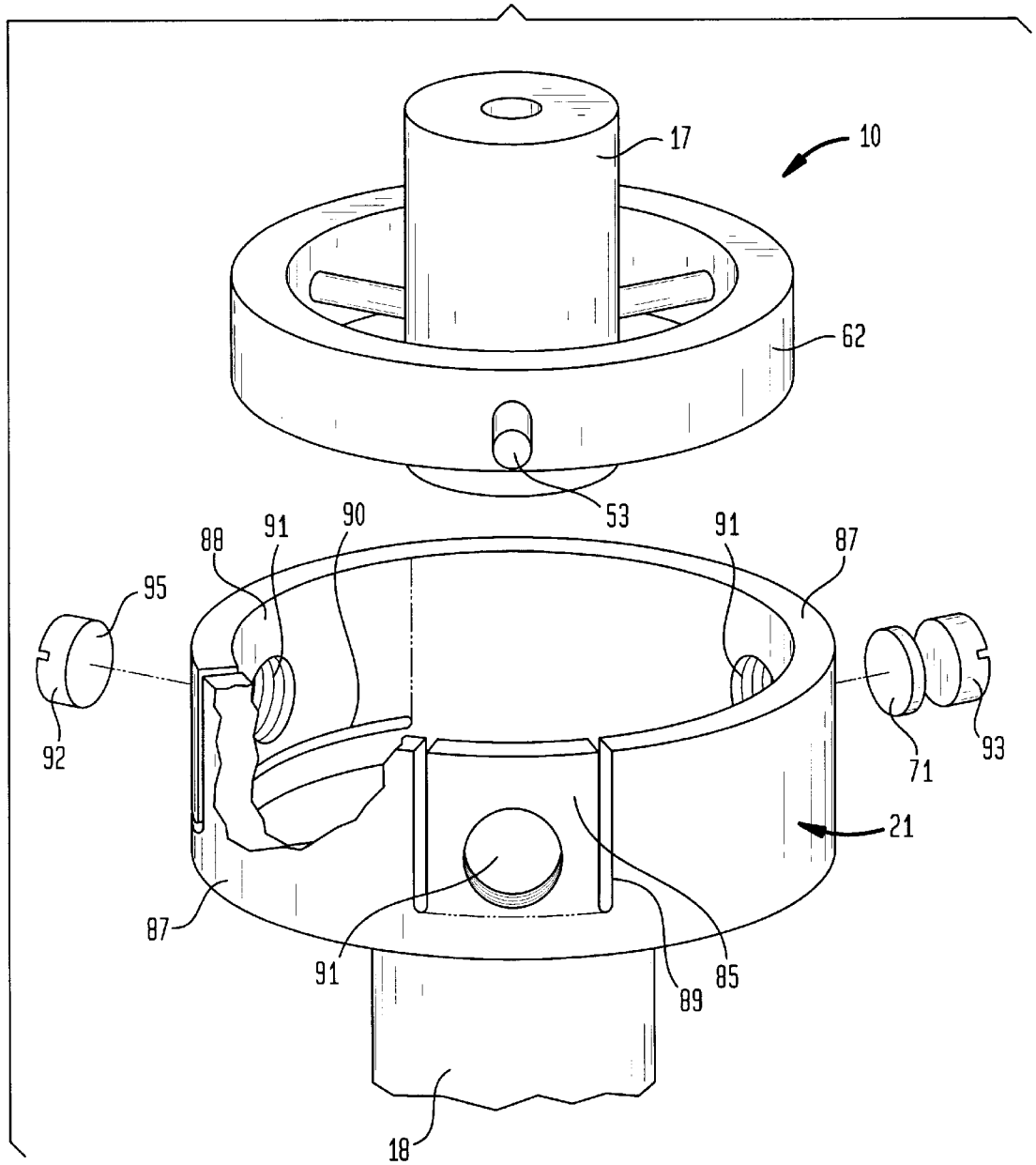
FIG. 12 is an exploded perspective illustration of the relevant components of still another embodiment of a hot runner nozzle according to the present invention.

FIG. 12 shows an exploded perspective illustration of the relevant components of still another embodiment of a hot runner nozzle 10 for use in e.g. the injection mold of FIG. 1. In this embodiment, the sleeve 18 is connected to the flange 21 which is shown by way of the wall 87 bounding the groove 85 (cf. FIGS. 6 and 7) to the outside. A sufficient contact pressure of the current-carrying bridges 53 upon the sleeve 17 can be realized in various ways, of which three options are shown in FIG. 12. In this type of nozzle 10, the current distributor 62 does not assume the additional task to push the current-carrying bridges 53 against the sleeve 17;

rather, the distributor 62 is only provided to conduct the current to the current-carrying bridges 53. One option to realize the contact pressure includes the provision of a threaded bore 91 in the wall 87 for threaded engagement of a bolt 92 or the like, with the threaded bore 91 being formed in a partially cut out segment 88 of the wall 87 so that the segment 88 becomes spring-elastic to a limited extent. Instead of forming the segment 88 by an L-shaped groove 90, the segment 88 may also be formed by parallel grooves 85. A third option to realize the spring-elasticity, without providing such separating grooves, can also be realized by placing a resilient member, e.g. a disk spring, onto a bolt 93 which is threaded into the bore 91.

It should also be noted that the current-carrying bridges 53 are electrically insulated against the bolts as well as against resilient members.

Persons skilled in the art will understand that it certainly within the scope of the present invention to materially join, e.g. through soldering, the free ends of the current-carrying bridges 53 with the corresponding contact surfaces of the sleeve 17, to thereby effect a good contact. A possibility of such a bond can be realized by using suitable solder or the like and subjecting the heating unit to pulses of high current exceeding the normal operational current in order to generate the heat required for soldering.

While the invention has been illustrated and described as embodied in a hot runner system, in particular hot runner nozzle for an injection molding machine or plastics injection mold, it is not intended to be limited to the details shown since various modifications and structural changes may be made without departing in any way from the spirit of the present invention.

What is claimed as new and desired to be protected by Letters Patent is set forth in the appended claims:

1. A hot runner system, comprising:
   a central heating rod having opposite ends;
   a sleeve assembly enclosing the rod and split radially to define first and second sleeves abutting one another, wherein one of the opposite ends of the rod is electrically connected to a free end of the first sleeve and the other one of the opposite ends of the rod is electrically connected to a free end of the second sleeve, said second sleeve having another end distant to the free end thereof and formed with a flange;
   a casing flange surrounding and electric insulating the first sleeve, said casing flange having one end face materially joined with an end face of the flange of the second sleeve wherein the casing flange and the flange of the second sleeve define at least one common flow passageway bounded by a wall surface made entirely of metal; and
   current-conducting means for feeding an electric current to the sleeve assembly.

2. The hot runner system of claim 1 wherein said end face of the casing flange is joined with the end face of the flange of the second sleeve by soldering.

3. The hot runner system of claim 1 wherein the current-conducting means includes at least one current-carrying bridge connected to first sleeve in proximity of the second sleeve and directed outwardly for linkage to a connector.

4. The hot runner system of claim 3 wherein the current-conducting means includes a current distributor electrically connected to the connector, said current-carrying bridge forming an electric connection between the first sleeve and the distributor.

5. The hot runner system of claim 4 wherein the distributor is of substantial ring-shaped configuration which describes a full circle or a partial circle.

6. The hot runner system of claim 4 wherein the first sleeve has an outer surface area, said current distributor having an inside wall surface and said current-carrying bridge having lateral wall surfaces, said outer surface area of the first sleeve together with the inside wall surface of the current distributor and the lateral wall surfaces of the current-carrying bridge defining openings, said common flow passageway being defined by aligned flow channels in the casing flange and the flange of the second sleeve and demarcated by walls of the casing flange and the flange of the second sleeves, with said flow channels traversing said openings.

7. The hot runner system of claim 6 wherein the casing flange is so recessed as to complement a configuration of the first sleeve, the current-carrying bridge and the distributor, with an electric insulation being arranged between confronting surfaces.

8. The hot runner system of claim 4 wherein the casing flange almost entirely surrounds the first sleeve, the current-carrying bridge and the distributor, except for an area opposing the flange of the second sleeve.

9. The hot runner system of claim 1, and further comprising a terminal cap for covering the free end of the first sleeve and an adjacent free end of the heating rod.

10. The hot runner system of claim 4 wherein the distributor is formed with openings separated by the current-carrying bridge, said flow channels being formed by separate segments having an outer contour complementing a contour of the openings, with adjoining surfaces being electrically insulated from one another.

11. The hot runner system of claim 10 wherein the segments have end faces materially joined to adjacent surfaces of the casing flange and the flange of the second sleeve.

12. The hot runner system of claim 11 wherein the end faces of the segments are soldered to the adjacent surfaces of the casing flange and the flange of the second sleeve.

13. The hot runner system of claim 1 wherein the current-carrying bridge has a free end which is materially joined to a complementary contact surface of the first sleeve.

14. A hot runner system, comprising:
   a central heating rod having opposite ends and defining a longitudinal axis;
   a sleeve assembly surrounding the rod and split radially to define first and second sleeves abutting one another, wherein one of the opposite ends of the rod is electrically connected to a free end of the first sleeve and the other of the opposite ends of the rod being electrically connected to a free end of the second sleeve, said second sleeve having another end distant to the free end thereof and formed with a flange which extends substantially parallel to the longitudinal axis and forms at least one flow passageway for melt, said flow passageway being bounded along its entire length by a wall surface made entirely of metal; and
   current-conducting means for feeding an electric current to the sleeve assembly.

15. The hot runner system of claim 14 wherein the flow passageway is arranged radially and is interrupted by a web.

16. The hot runner system of claim 14 wherein the flange has at least two flow passageways separated by webs.

17. The hot runner system of claim 15 wherein the current-conducting means includes a current distributor surrounding the first sleeve and an electrically insulated current-carrying bridge which is received in a channel of the web and extends perpendicular to the longitudinal axis, said current-carrying bridge conducting a current between the first sleeve and the current distributor.

18. The hot runner system of claim 17 wherein the current-carrying bridge is shaped in the form of a screw having a thread engaging in the current distributor which is positioned at a radial distance to the first sleeve and fully or partially encloses the first sleeve, with the current-carrying bridge having a free end bearing upon the first sleeve to form an electrical contact.

19. The hot runner system of claim 18 wherein the current distributor is elastically deformable when the current-carrying bridge is engaged to thereby press the current-carrying bridge by interference fit against the heating rod.

20. The hot runner system of claim 17 wherein the first sleeve has an eccentric outer contact surface confronting the current-carrying bridge so that the current-carrying bridge is elastically braced between the first sleeve and the current distributor when the first sleeve is rotated relative to the current distributor.

21. The hot runner system of claim 17 wherein the current distributor has an inside surface confronting the first sleeve and extending at an acute angle to the longitudinal axis so that the current-carrying bridge is wedged between the heating rod and the current distributor when the current distributor is shifted in axial direction relative to the first sleeve.

22. The hot runner system of claim 17 wherein the first sleeve has an outside surface confronting the current distributor and extending at an acute angle to the longitudinal axis so that the current-carrying bridge is wedged between the heating rod and the current distributor when the first sleeve is shifted in axial direction relative to the current distributor.

23. The hot runner system of claim 17 wherein the current distributor realizes a contact pressure as a consequence of its capability to deform elastically.

24. The hot runner system of claim 17 wherein the current-carrying bridge is mounted in the current distributor in an electrically conducting manner, said flange having a threaded bore for engagement by a screw which is in alignment with the current-carrying bridge and threaded into the threaded bore at a depth which determines a contact pressure.

25. The hot runner system of claim 17 wherein the flange has an outer wall formed with a threaded bore for receiving a screw, and further comprising a spring-elastic member arranged between the screw and the current-carrying bridge.

26. The hot runner system of claim 25 wherein the spring-elastic member is a disk spring.

27. The hot runner system of claim 25, and further comprising electrically insulating members provided between contact areas of the screw and the current-carrying bridge.

28. The hot runner system of claim 17 wherein the current-carrying bridge has a free end which is materially joined with a complementary contact surface of the first sleeve.

29. The hot runner of claim 14 wherein the flow passageway is uninterrupted over its entire length and made of a same material.

* * * * *